US007341123B2

(12) United States Patent
Brendel et al.

(10) Patent No.: US 7,341,123 B2
(45) Date of Patent: Mar. 11, 2008

(54) RUNNING WHEEL ARRANGEMENT FOR A WHEELCHAIR

(75) Inventors: Thomas Brendel, Sinsheim (DE); Heinz Perk, Aglasterhausen (DE); Oliver Kretschmer, Sinsheim (DE); Andreas Biederstadt, Klausdorf (DE)

(73) Assignee: Otto Bock HealthCare IP GmbH & Co., KG, Duderstadt (DE)

(*) Notice: Subject to any disclaimer, the term of this patent is extended or adjusted under 35 U.S.C. 154(b) by 384 days.

(21) Appl. No.: 11/202,375

(22) Filed: Aug. 12, 2005

(65) Prior Publication Data

US 2006/0076169 A1 Apr. 13, 2006

(30) Foreign Application Priority Data

Aug. 14, 2004 (DE) ..................... 10 2004 039 519

(51) Int. Cl.
*B60K 1/00* (2006.01)

(52) U.S. Cl. ..................................... 180/65.5; 180/907

(58) Field of Classification Search ............... 180/65.5, 180/907

See application file for complete search history.

(56) References Cited

U.S. PATENT DOCUMENTS

| | | | | |
|---|---|---|---|---|
| 3,613,813 | A * | 10/1971 | Biddle | 180/6.5 |
| 3,786,887 | A * | 1/1974 | Rosenthal et al. | 180/6.5 |
| 3,930,551 | A * | 1/1976 | Cragg | 180/65.6 |
| 3,955,639 | A * | 5/1976 | Cragg | 180/6.5 |
| 4,773,495 | A * | 9/1988 | Haubenwallner | 180/65.2 |
| 4,974,695 | A * | 12/1990 | Politte | 180/221 |
| 5,246,082 | A | 9/1993 | Alber | |
| 6,260,645 | B1 * | 7/2001 | Pawlowski et al. | 180/65.3 |
| 6,470,981 | B1 * | 10/2002 | Sueshige et al. | 180/19.3 |
| 6,860,347 | B2 * | 3/2005 | Sinclair et al. | 180/11 |
| 7,232,008 | B2 * | 6/2007 | Levi et al. | 180/907 |

FOREIGN PATENT DOCUMENTS

| | | |
|---|---|---|
| DE | 44 29 153 | 2/1996 |
| DE | 197 46 086 | 4/1999 |
| EP | 0 528 235 | 2/1993 |

* cited by examiner

*Primary Examiner*—Paul N. Dickson
*Assistant Examiner*—Bridget Avery
(74) *Attorney, Agent, or Firm*—Whitham Curtis Christofferson & Cook, P.C.

(57) ABSTRACT

A running wheel arrangement for a wheelchair that can be driven by electric motor including a frame and wheels releasably connected. A driving motor being integrated in two wheels and the wheels are connected via a respective adapter arranged on the frame. The wheel is inserted into the adapter and mechanically lockable via a locking device which includes: a pivot plate fastened to the driving motor; the wheel is mounted rotatably in a pivot plate via an axle bolt; a link bolt pointing in the direction of travel arranged in the adapter; a cross-sectionally U-shaped tab arranged at one end of the pivot plate; the tab being placed onto the link bolt such that the wheel is shifted by means of a pivoting movement toward the frame until a locking bolt provided on the pivot plate engaged on the locking bush arranged on the adapter, and the wheel is locked mechanically with respect to the frame via the locking bolt and the locking bush.

3 Claims, 5 Drawing Sheets

RUNNING WHEEL ARRANGEMENT FOR A WHEELCHAIR

DESCRIPTION BACKGROUND OF THE INVENTION

1. Field of the Invention

The invention relates to a running wheel arrangement for a collapsible wheelchair which can be driven by electric motor, to whose frame wheels can be releaseably connected, with a respective driving motor being integrated in two wheels, and the connection of these wheels taking place via a respective adapter arranged on the frame, and the wheel inserted with the adapter being lockable with respect to the frame via a locking device.

2. Background Description

A running wheel arrangement of this type is known, for example, from DE 197 46 086 A1. For manually operated wheelchairs there are electric additional drives in order to make a larger radius of action possible for the user. These additional drives pass on their driving force via an electric motor arranged in the hub of the driving wheel. This electric motor is controlled by the user from the armrest via an operating console provided with a joystick. The electric power is passed from a battery, which is generally arranged centrally under the seat surface, to the driving system. One requirement of a wheelchair is the possibility of transporting it in motor vehicles or the possibility of being able to readily stow the wheelchair in confined space conditions. In order to satisfy this requirement, the driving wheels are provided with an adaptation system which are intended to make it easier for the user to couple up and remove the wheels from the wheelchair framework.

In the case of the above-described system, the adapter, which is connected to the frame, has a groove which is open toward the tire contact area. The rear wheel is mounted rotatably on a full floating axle provided with a rapid clamping system. Like the front wheel of a bicycle, the driving wheel can be pushed in the radial direction by the axle into the adapter and locked there.

In the case of the wheelchair known from EP 0 528 235 B1, the driving wheel is also provided with a full floating axle. The frame of the wheelchair is designed in such a manner that the wheel can be connected to the frame in the axial direction.

For installation and removal purposes, the wheelchair has to be raised on one side in the case of both systems. The handling is therefore quite complicated for a user who is restricted in his movement.

Starting from this definition of the problem, the running wheel arrangement described at the beginning is to be improved in such a manner that the installation and removal of the driving wheels on/from the wheelchair is simplified.

SUMMARY OF THE INVENTION

To solve the problem, a running wheel arrangement of the generic type is distinguished by the following features:

a) a pivot plate is fastened to the driving motor,
b) the wheel is mounted rotatably in the pivot plate via an axle bolt,
c) a link bolt pointing in the direction of travel is arranged in the adapter,
d) a cross-sectionally U-shaped tab is arranged at one end of the pivot plate,
e) the tab can be placed onto the link bolt in such a manner that the wheel can be shifted by means of a pivoting movement toward the frame until a locking bolt provided on the pivot plate engages on a locking bush arranged on the adapter, and
f) the wheel can be locked mechanically with respect to the frame via the locking bolt and the locking bush.

The opening of the tab is designed such that it faces away from the contact area of the wheel. The wheel can consequently be positioned at an oblique angle with respect to the ground or the frame and can be pushed by the tab onto the link bolt. The wheel is then pivoted upward and automatically locks to the frame. A raising of the wheelchair is not necessary here. For removal purposes, the lock is released and the wheel pivoted down toward the ground. The wheelchair does not need to be raised on one side here either, since the wheel can be pivoted away below it.

The locking bolt and the locking bush are preferably provided with electric contacts via which the power supply of the driving motor integrated into the wheel takes place.

In particular, it is advantageous if the locking device is of self-locking design. This further simplifies the installation of the wheel.

BRIEF DESCRIPTION OF THE DRAWINGS

An exemplary embodiment of the invention will be described in more detail below with the aid of a drawing, in which.

DESCRIPTION OF PREFERRED EMBODIMENT

Figure 1:
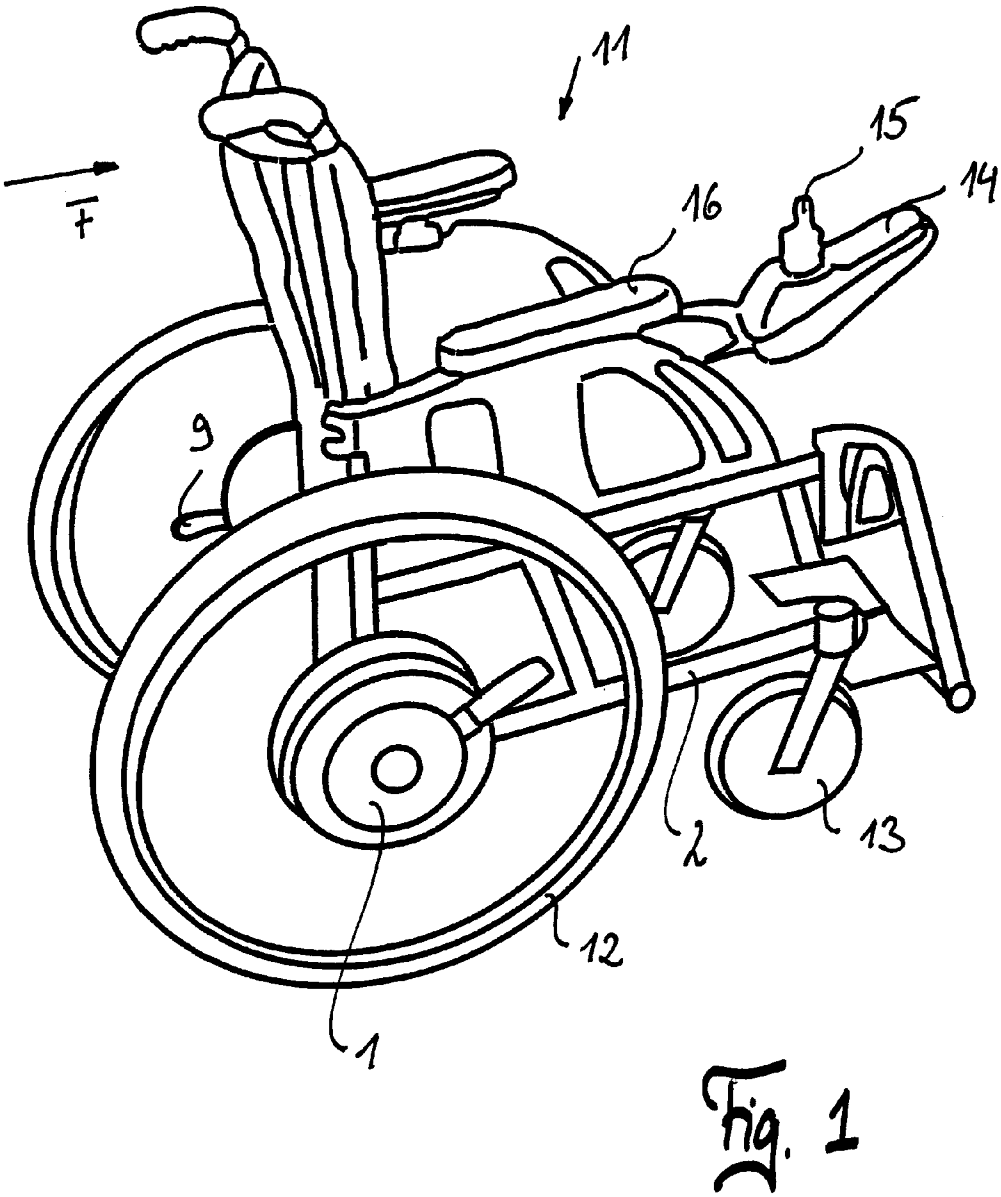
FIG. 1 shows the perspective illustration of a wheelchair.
Figure 2:
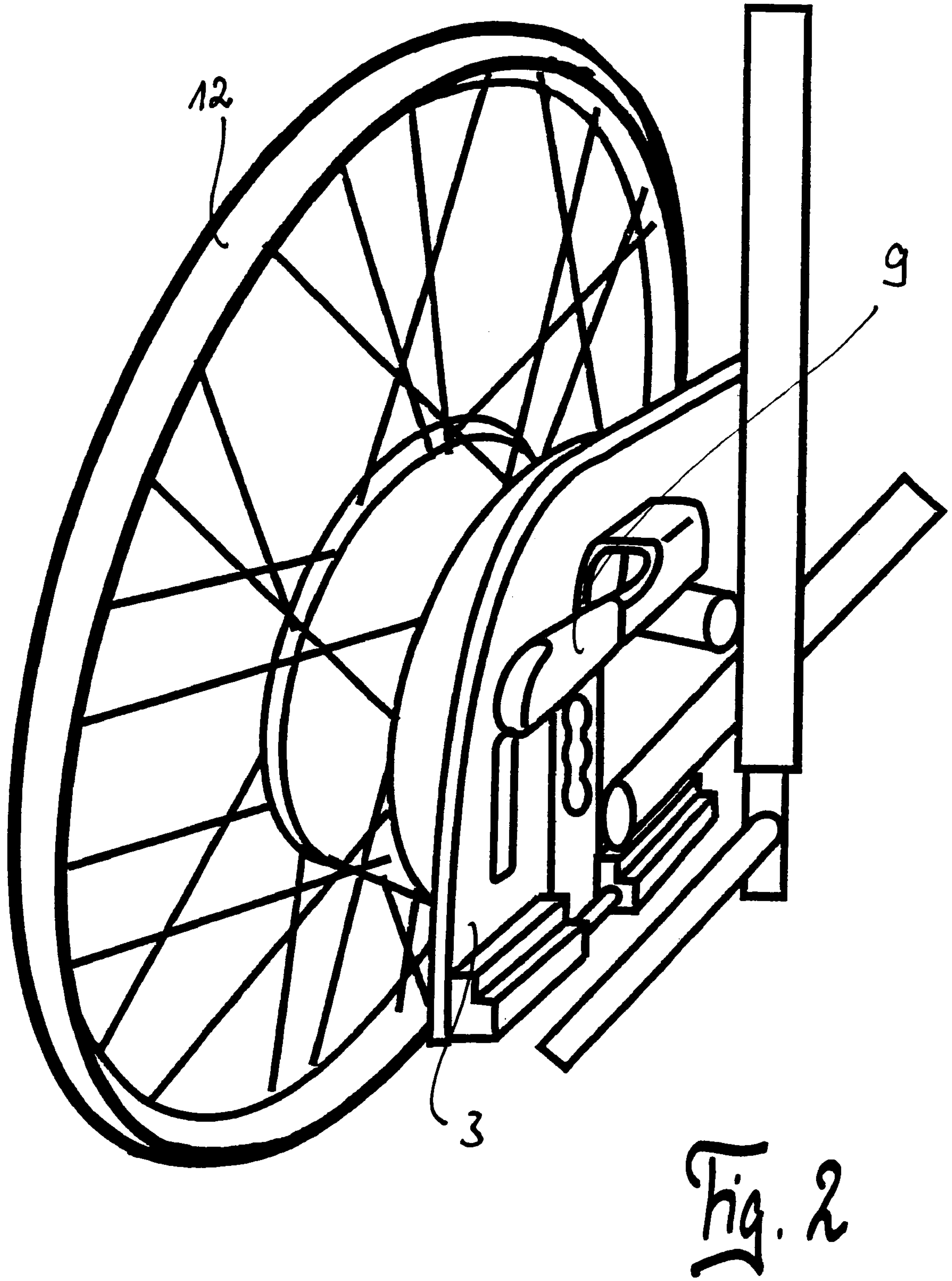
FIG. 2 shows a perspective partial view of the wheelchair according to FIG. 1.

The wheelchair 11 comprises the collapsible frame 2 to which the running wheels 12, which are provided with a hub driving motor 1, are releaseably connected. The driving motors 1 are controlled by the user from the armrest 16 via an operating console 14 provided with a joystick 15. The hub driving motor 1 can be designed, for example, as a gearless external rotor motor with electric commutation and electromagnetic brake. Electric and electronic circuit components may be provided for the drive. The power supply of the driving motors 1 takes place via a battery (not illustrated here) which is arranged under the seat. The driving motors 1 and the rims 17 of the wheel 12 are connected to one another via the spokes 18.

The connection between the driving wheel 12 and the frame 2 of the wheelchair 11 takes place via a hinge-like construction. A pivot plate 3 is connected fixedly to the driving motor 1. The wheel 12 is mounted rotatably in the pivot plate 3 via an axle bolt 4. The axle bolt 4 projects beyond the pivot plate 3. At its end facing the contact area of the wheel 12, the pivot plate 3 is provided with a cross-sectionally U-shaped tab 31. The opening 32 of the tab 31 faces away in the direction opposite the tire contact area. At its end opposite the tab 31, the pivot plate 3 has a locking bolt 5. The locking bolt 5 is hollow and in its interior has contacts 17 which are connected electrically to the motor 1.

An adapter 7 is connected fixedly to the frame 2. Between two pillow blocks 7A, 7B, a link bolt 8 which extends in the direction of travel F is provided at the adapter 7 in the region of the vicinity of the tire contact area. At its upper end, the adapter 7 is provided with a locking bush 6 and a locking lever 9 which interacts with the latter and has a securing spring 10. The locking bush 6 is likewise provided in its interior with electric contacts 18, which corresponds to the contacts 17 in the licking bolt 5.

Figure 3:
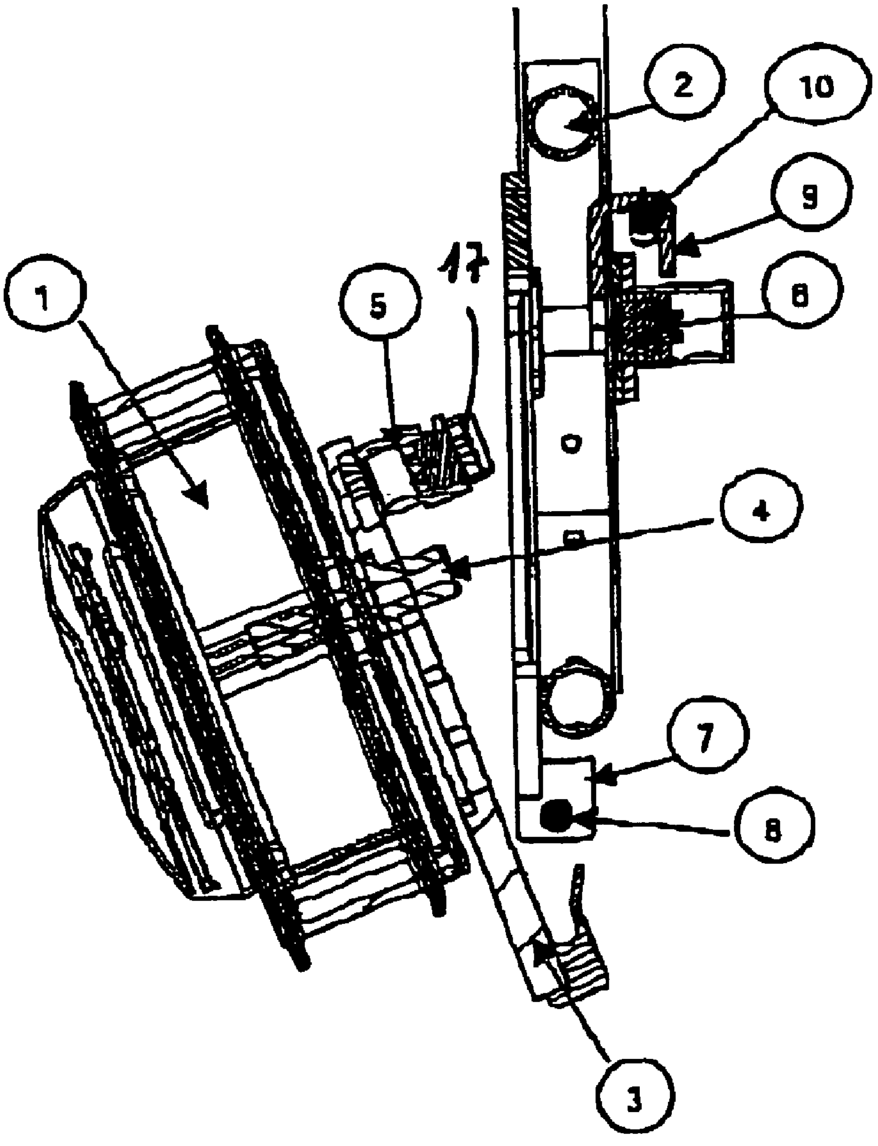
FIG. 3 shows the section centrally with respect to the axis of rotation of the driving hub through the running wheel arrangement in the non-connected state.
Figure 4:
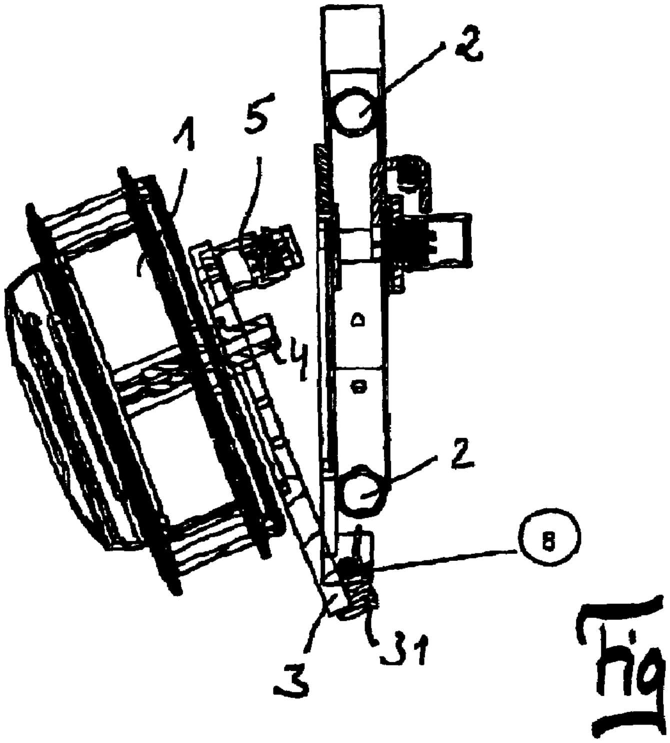
FIG. 4 shows the arrangement according to FIG. 3 after the connection of the running wheel arrangement.
Figure 5:
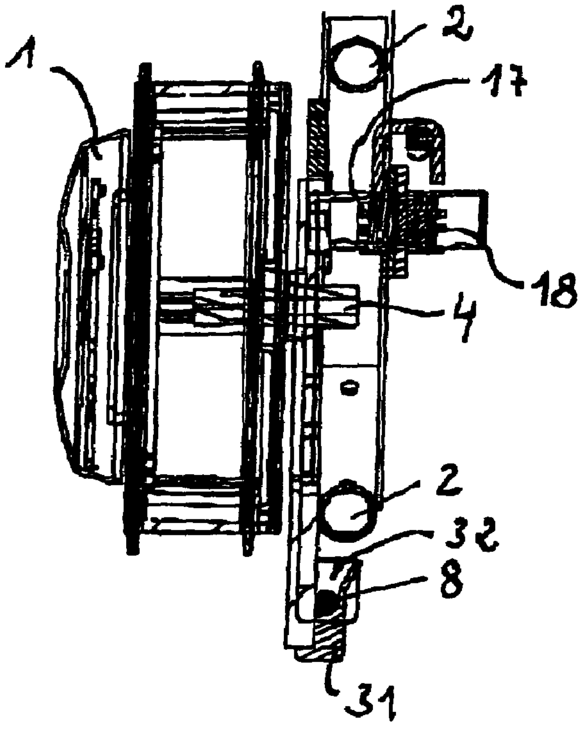
FIG. 5 shows the illustration according to FIG. 3 after locking of the running wheel arrangement.
Figure 6:
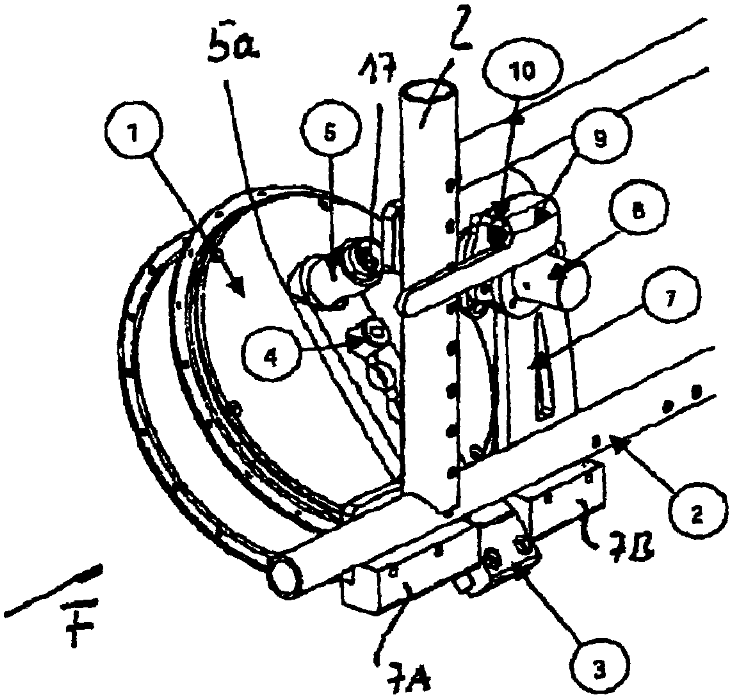
FIG. 6 shows the perspective illustration of the arrangement according to FIG. 4.
Figure 7:
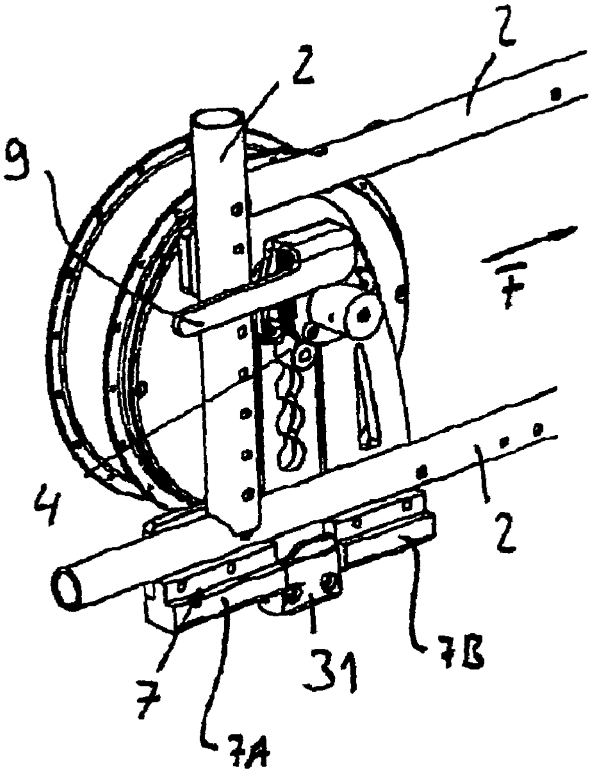
FIG. 7 shows the perspective illustration of the arrangement according to FIG. 5.

In order to connect the wheel 12 to the frame 2 of the wheelchair 1, the wheel 12 is positioned obliquely below the framework of the wheelchair 11 (compare FIG. 3) and the pivot plate 3 is pushed onto the link bolt 8 by the tab 31 (compare FIG. 4). The wheel 12 is subsequently pivoted upward in the direction of the wheelchair 11 until the locking bolt 5 enters the locking bush 6 and the securing spring 10 snaps into a radial recess 5*a* in the locking bolt 5 and, as a result, the wheel 12 is automatically locked to the adapter 7 and therefore to the wheelchair 11. During the locking operation, the contacts 17 in the locking bolt 5 engage in the manner of a plug-in connection into the contacts 18 in the bush 6, so that the driving motor 1 is connected to the power supply.

In order to remove the wheel 12, the locking lever 9 is pivoted, so that the securing spring 10 comes out of contact with the locking bolt 5 and the wheel 12 can be pivoted away from the wheelchair 11 and can then be lifted out downward.

LIST OF REFERENCE SYMBOLS

1 Hub driving motor/driving motor
2 Frame
3 Pivot plate
4 Axle bolt
5 Locking bolt
5*a* Radial recess
6 Locking bush
7 Adapter
7A Pillow block
7B Pillow block
8 Link bolt
9 Locking lever
10 Securing spring
11 Wheelchair
12 Wheel
13 Front wheel
14 Operating console
15 Joystick
16 Armrest
17 Contacts
18 Contacts
31 Tab
32 Opening
F Direction of travel

The invention claimed is:

1. A running wheel arrangement for a in particular collapsible wheelchair which can be driven by electric motor, a frame (2) to which wheels (12) can be releaseably connected, with a respective driving motor (1) being integrated in two wheels (12), and the connection of these wheels (12) being via a respective adapter (7) arranged on the frame (2), and the wheel inserted into the adapter (7) being mechanically lockable with respect to the frame (2) via a locking device (5, 6), which comprises:

a) a pivot plate (3) fastened to the driving motor (1), b) the wheel (12) is mounted rotatably on the pivot plate (3) via an axle bolt (4), c) a link bolt (8) pointing in the direction of travel F is arranged in the adapter (7), d) a cross-sectional U-shaped tab (31) is arranged at one end of the pivot plate (3), e) the tab (31) can be placed onto the link bolt (8) in such a manner that the wheel (12) can be shifted by means of a pivoting movement toward the frame (2) until a locking bolt (5) provided on the pivot plate (3) engages in a locking bush (6) arranged on the adapter (7), and f) the wheel can be locked mechanically with respect to the frame (2) via the locking bolt (5) and the locking bush (6).

2. The running wheel arrangement as claimed in claim 1, wherein the locking bolt (5) and the locking bush (6) have electric contacts (17, 18) via which the power supply of the driving motor (1) integrated into the wheel (12) operates.

3. The running wheel arrangement as claimed in claim 1, wherein the locking device (6, 10) of self-locking design.

* * * * *